(12) United States Patent
Chen

(10) Patent No.: US 7,490,531 B2
(45) Date of Patent: Feb. 17, 2009

(54) ACCESSORY HANDLE FIXING BASE FOR BICYCLE (I)

(75) Inventor: Chuan-Feng Chen, Taichang Hsien (TW)

(73) Assignee: Ourway Engineering Co., Ltd., Taichung Hsien (TW)

( * ) Notice: Subject to any disclaimer, the term of this patent is extended or adjusted under 35 U.S.C. 154(b) by 612 days.

(21) Appl. No.: 11/126,163

(22) Filed: May 11, 2005

(65) Prior Publication Data

US 2005/0252331 A1 Nov. 17, 2005

(30) Foreign Application Priority Data

May 12, 2004 (TW) ............................. 93207372 U

(51) Int. Cl.
*B62K 21/12* (2006.01)
(52) U.S. Cl. ..................................... 74/551.8; 74/551.1
(58) Field of Classification Search ................ 74/551.1, 74/551.8, 551.3, 551.9; 280/278, 279, 287, 280/288.4
See application file for complete search history.

(56) References Cited

U.S. PATENT DOCUMENTS

| 7,207,237 B2 * | 4/2007 | Johnson ..................... 74/551.8 |
| 7,213,485 B2 * | 5/2007 | Huang ....................... 74/551.8 |
| 2005/0044981 A1 * | 3/2005 | Huang ....................... 74/551.8 |
| 2005/0132839 A1 * | 6/2005 | Chen ......................... 74/551.8 |
| 2007/0039409 A1 * | 2/2007 | Meng ........................ 74/551.8 |
| 2008/0079235 A1 * | 4/2008 | Chao et al. .................. 280/279 |

FOREIGN PATENT DOCUMENTS

WO WO 2005/084316 A2 * 9/2005 ................ 74/551.8

* cited by examiner

*Primary Examiner*—Vinh T. Luong
(74) *Attorney, Agent, or Firm*—Troxell Law Office PLLC

(57) ABSTRACT

A kind of accessory handle fixing base for a bicycle, including an accessory handle, two cushions for elbow's relaxation, and fixing bases. It features include making the lower section of the fixing base be an arc position sheet, and making the radian of the position sheet with the front middle of the handle. As a result, the fixing base for fixing the accessory handle can be combined at the locking section of the handle and standpipe when the middle section of the handle is locked in an arc groove positioned at the front end of the handle standpipe and the combination groove is combined with a standpipe.

2 Claims, 7 Drawing Sheets

ACCESSORY HANDLE FIXING BASE FOR BICYCLE (I)

BACKGROUND OF THE INVENTION

1) Field of the Invention

The present invention relates to an accessory handle fixing base, which is applied to bicycles, i.e. an improved accessory handle structure which can be easily added on the conventional bicycles.

2) Description of the Prior Art

With the social changes, people not only begin to focus on the products' functions, but also their innovation gradually, as far as the bicycle handle concerned, as that.

Yet, as far as the bicycle handle 2 in the factories concerned, generally, it is bent directly with a round pipe referring to the FIG. 1, i.e. the whole handle is designed a round one from a handling part on both sides of the front end, next the middle part 21 of the front would be integrated and locked with the front of a handle standpipe (the drawing not available for prior structure) together by a combining sleeve (the drawing not available for prior structure). But this kind of handle 2 formed by means of bending the round pipe directly has been used for many years, not novel for users. Therefore, the manufacturer in the factories adds an accessory handle on the former handle 2, as shown in FIG. 2. It is composed of two nearly L-shaped pipes 31 positioned in a reverse order for user's handling, whose middle section is a parallel and front handling part 311 towards the forward direction, and two cushions 32 positioned on the two outside top ends of the pipes 31 respectively for the relaxation of user's elbow on them and position, and two fixing bases 33 positioned on the bottom of the middle end of the pipes 31 respectively. In which the fixing bases 33 is composed of two parts half-to-half, and the opposite sides are semicircular and locked with the two front ends of the handle 2 made of round pipe respectively. And we can lock the accessory handle 3 on the two front sides of the handle 2, so that user would have different feelings while riding the bicycle.

Nevertheless, we found the foregoing accessory handle 3 must be combined with the conventional handle 2 having the fixing bases 33 positioned on the bottom of middle end of the pipe 31 respectively; in addition, it can be integrated and locked well on the two sides of front end of the handle 2. Therefore it would be very inconvenient under the condition that the fixing bases 33 should be designed as two parts half-to-half and the opposite sides should be semicircular. Therefore it should be troublesome while assembling and needs to be overcome.

SUMMARY OF THE INVENTION

In order to solve the problem in the related art, the present invention particularly provides a kind of accessory handle fixing base for bicycle, which is composed of: an accessory handle, two cushions for elbow's relaxation and fixing bases. It features that: to make the lower section of the fixing base be an arc position sheet, and make the radian of the position sheet same with the one of the outside pipe at the front middle of the handle. At the same time, joint the sheet on the outer edge of the pipe at the front end of the handle. So that the fixing base for fixing the accessory handle can be combined at the locking section of the handle and standpipe when the middle section of the handle is locked in arc groove at the front end of the handle standpipe and the combination groove is combined with standpipe by some screws. Accordingly an accessory handle can be installed easily on the conventional bicycle handle.

DETAILED DESCRIPTION OF THE PREFERRED EMBODIMENTS

Figure 1:
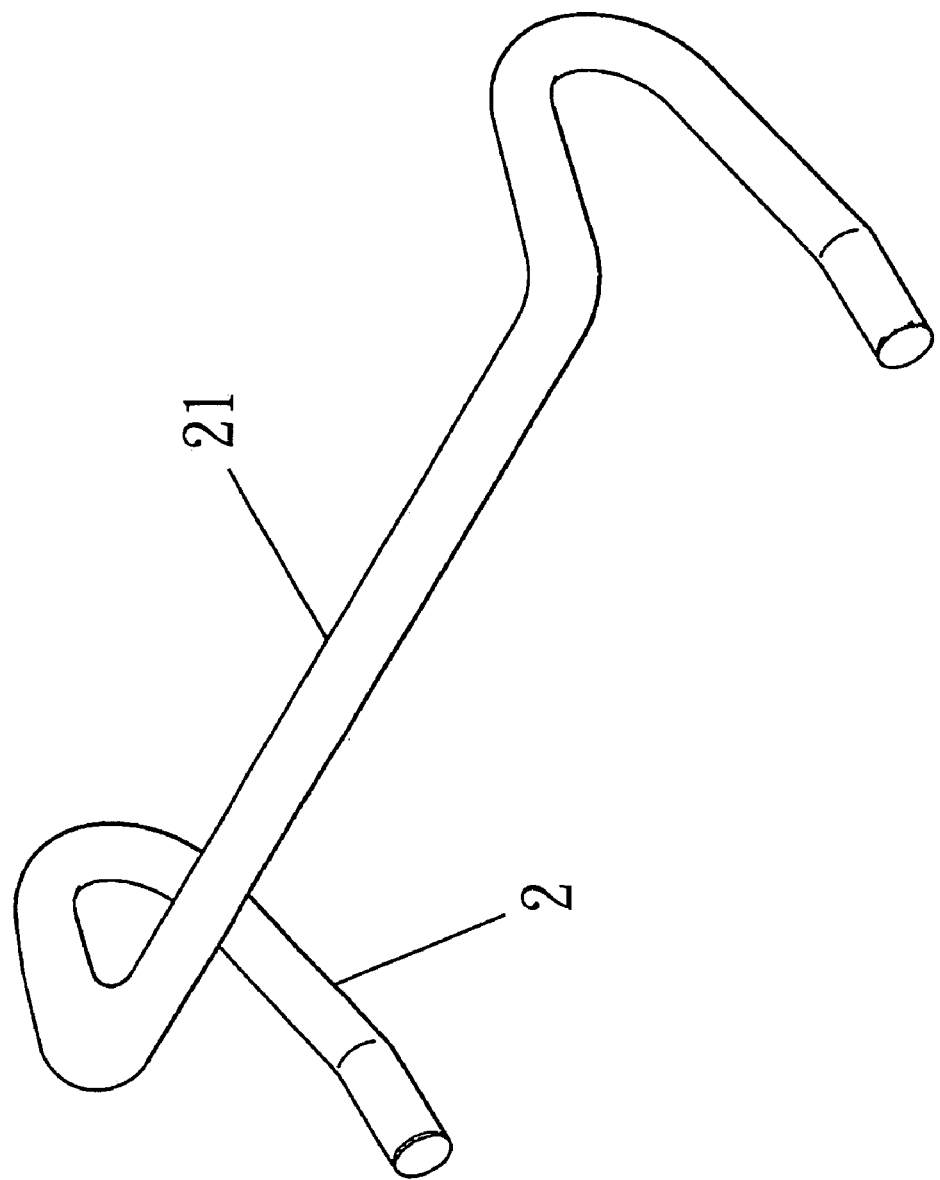
FIG. 1 is the sketch map of the prior invention.
Figure 2:
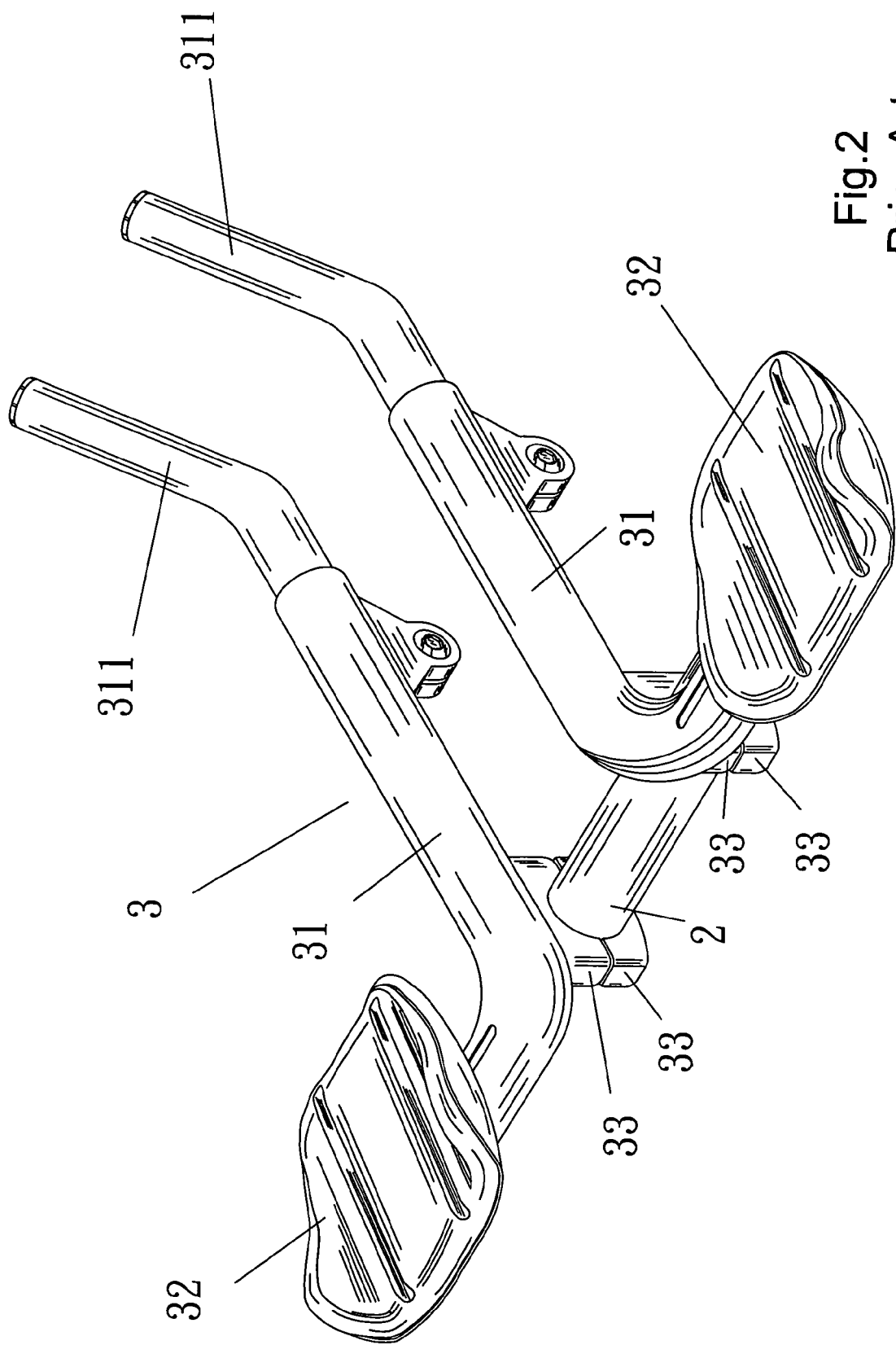
FIG. 2 is the sketch map of the prior accessory handle installed on the conventional handle.
Figure 3:
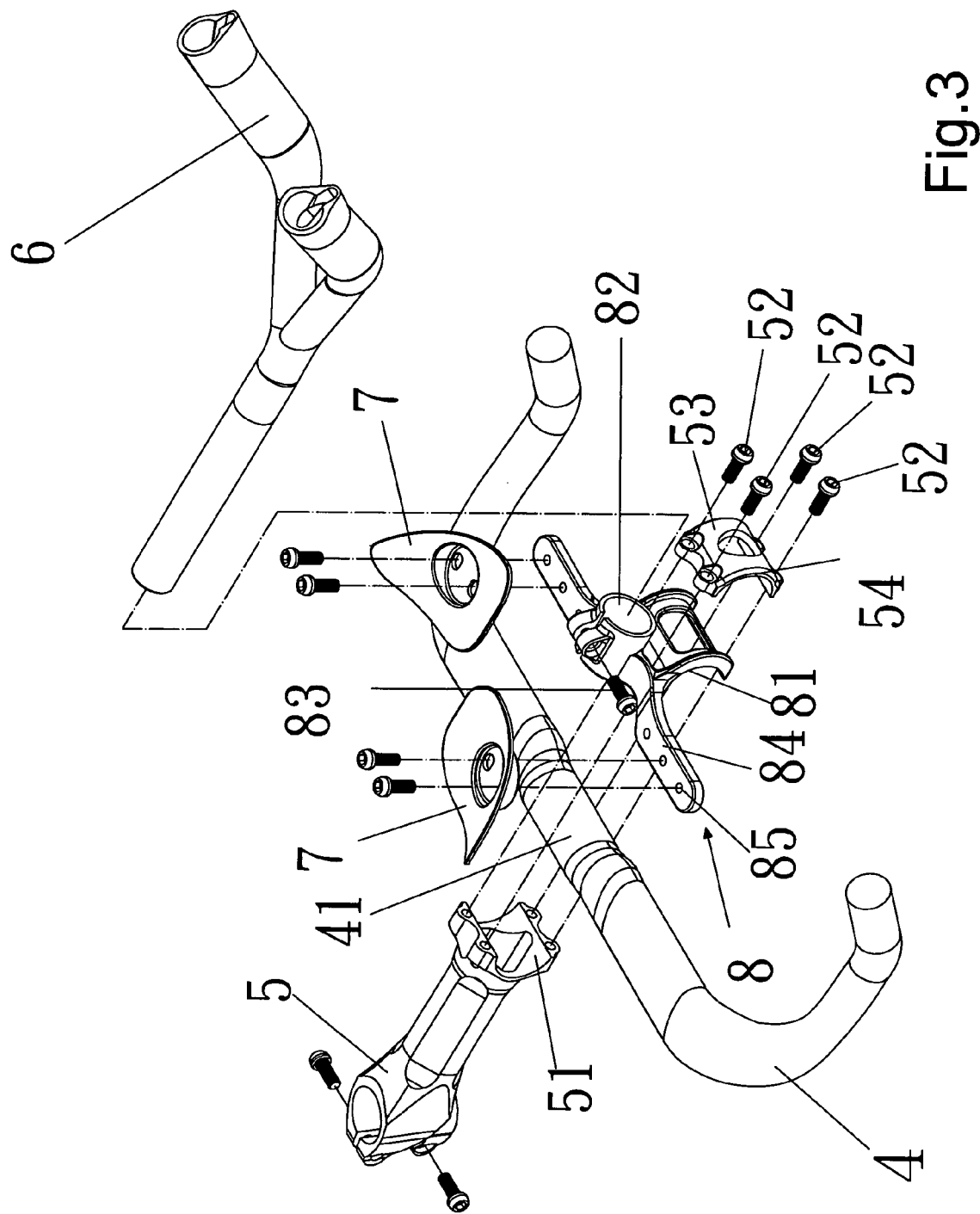
FIG. 3 is the three-dimensional exploded view of the present invention.
Figure 4:
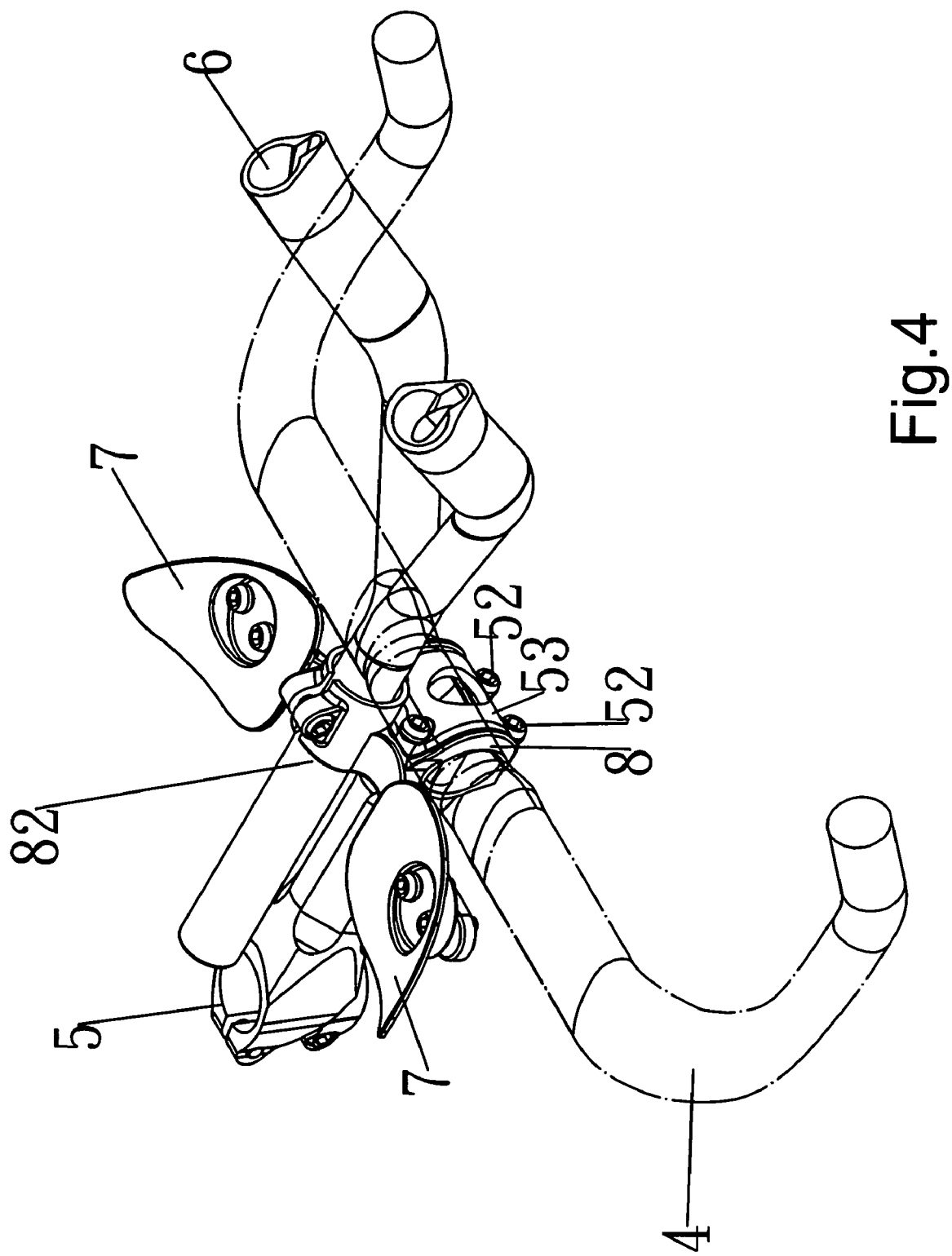
FIG. 4 is the three-dimensional combination diagram of the present invention.
Figure 5:
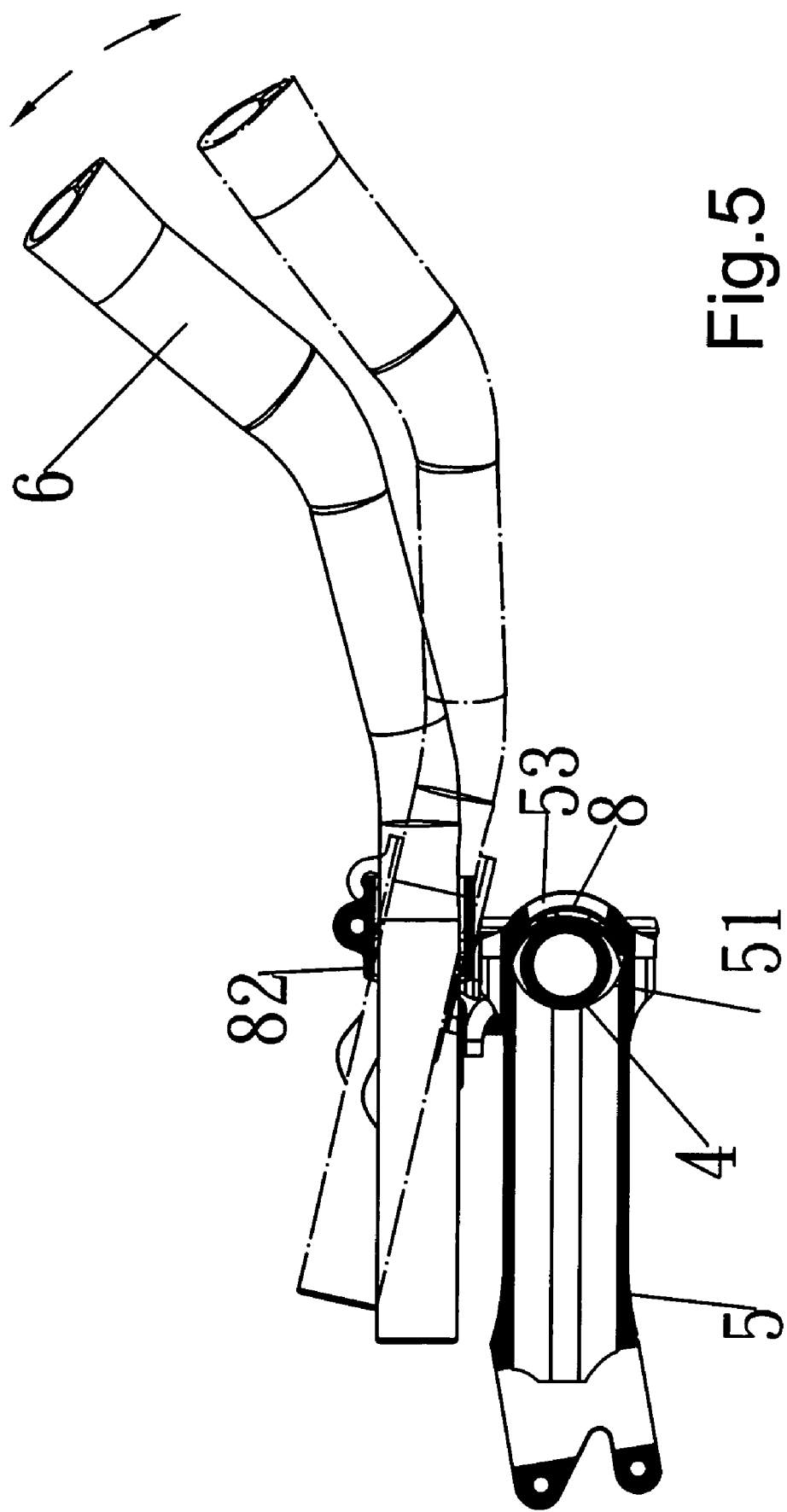
FIG. 5 is the combination side view of the present invention.

For your deep understanding of the present invention, the structure characteristics and operation etc. would be described as reference with drawings as follows:

Referring to the FIG. 3, FIG. 4 and FIG. 5, the present invention provides a kind of accessory handle fixing base, which can be installed on the conventional bicycle handle, in the course of locking the front middle 41 of the handle 4 in the arc groove 51 positioned at the front end of the handle standpipe 5 by means of corresponding to another arc groove 51 to the arc groove 54 of an arc plate 53 with screws 52. The present invention mainly is composed of an accessory handle 6, two cushions for elbow's relaxation 7, and fixing bases 8, featuring that: to make the lower section of the fixing base 8 be an arc position sheet 81, and make the radian of the position sheet 81 same with the one of the outside pipe at the front middle 41 of the handle 4. At the same time, joint the sheet on the outer edge of the pipe at the front middle 41 of the handle 4; additionally, a position hole 82 is designed on the center of the upper section for the insertion of the end of the accessory handle 6, combining, and locking with the screws 83; moreover, a position base, 84 is designed respectively on the two sides of the position hole 82, on which many adjusting holes 85 are available for locking the cushions 7 together and adjusting the distance between cushions 7. Thus, according to the foregoing structure, the fixing base 8 for fixing the accessory handle 6 can be combined at the locking position section of the handle 4 and standpipe 5 and an accessory handle can be installed on the conventional bicycle handle (as shown in FIG. 4) while locking the front middle 41 of the handle 4 in the arc groove 51 positioned at the front end of the handle standpipe 5 by means of corresponding to another arc groove 51 to another arc groove 54 with many screws 52. Furthermore, based on the same radian of the position sheet 81 at the lower section of the fixing bases 8 and the outside pipe at the front middle 41 of the handle 4, the accessory handle 6 can be adjusted upwards or downwards properly depending on user's demands (as shown in FIG. 5).

Figure 6:
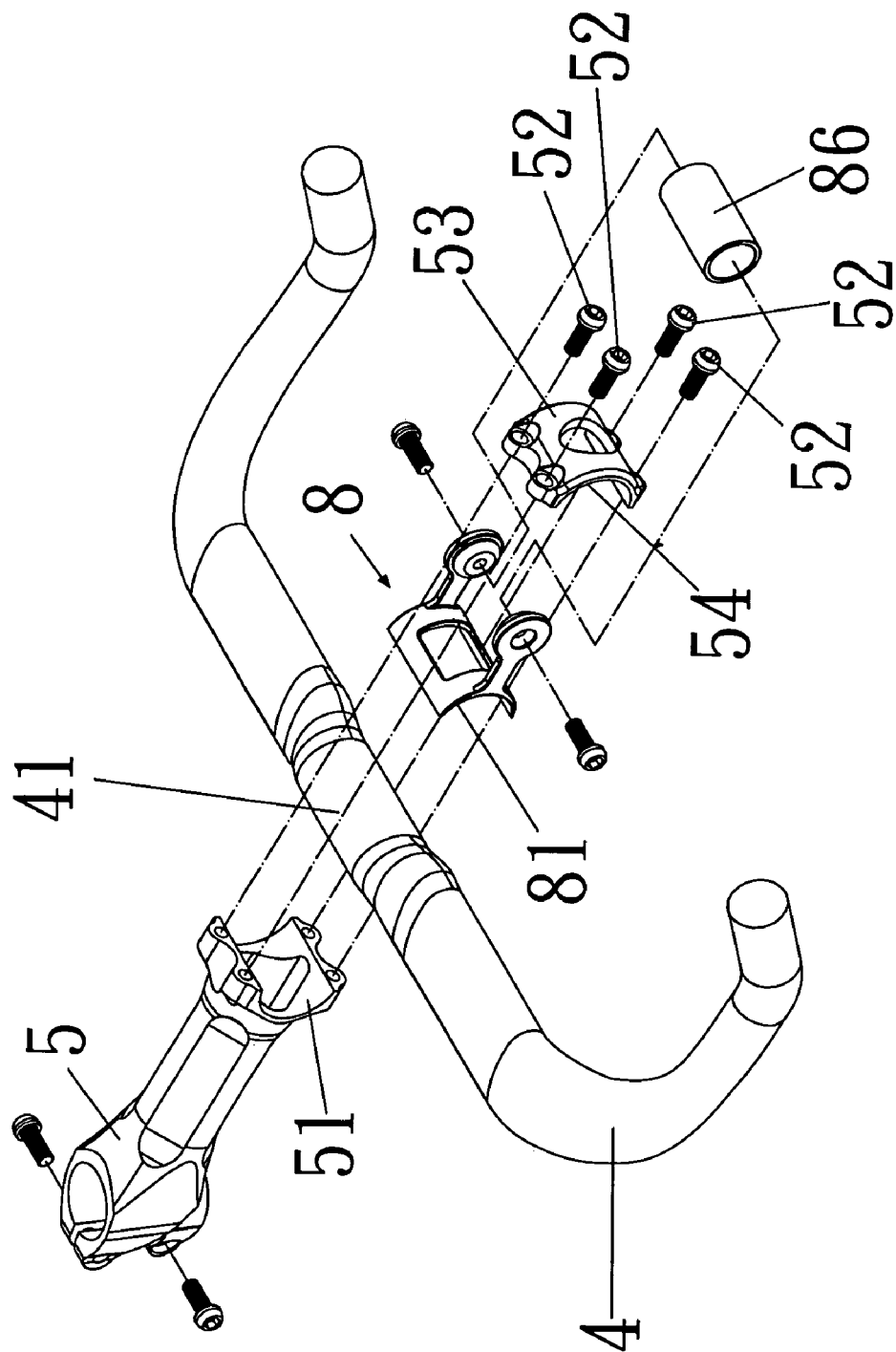
FIG. 6 is the exploded perspective view of another embodiment of the present invention.
Figure 7:
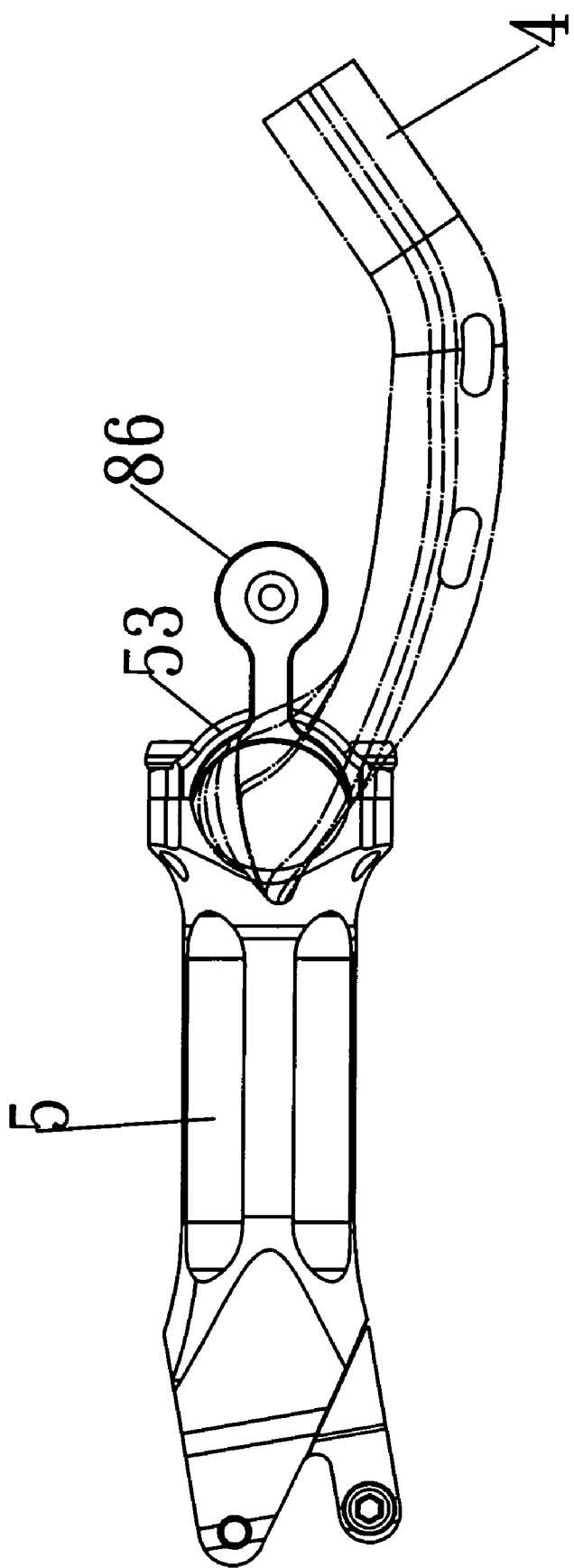
FIG. 7 is the combination side view of another embodiment in accordance with the present invention.

And, referring to the FIG. 6 and FIG. 7, we can make the lower section of the fixing bases 8 for fixing the accessory handle 6, added on the conventional bicycle handle 4, be arc position sheets 81 and make the radian of the position sheet 81 same with the one of the outside pipe at the front middle 41 of the common bicycle handle 4, and redesign the upper section as a position pipe 86 after jointing the sheet on the outer edge of the pipe at the front middle 41 of the handle 4, so that some meters for measuring time or speed, or other articles can be laid on the outer edge of the position pipe 86.

According to the foregoing description, the present invention can solve the defect of the prior related invention. Its performance and advantages are obvious. In addition, it never appears in any publication. So it accords with the requirements for the utility model.

What is claimed is:

1. An accessory handle fixing base for a bicycle handle, comprising:
   an arc position sheet configured for mating with a middle section of the bicycle handle;
   a position base mounted to an upper surface of the arc position sheet, the position base being formed by two lateral extensions laterally extending from the arc position sheet;
   an arc plate having an arc groove and fasteners for securing the arc position sheet to a standpipe, the bicycle handle and the arc plate both being clamped between another arc groove of the standpipe and the arc groove of the arc plate;
   two elbow cushions mounted to upper surfaces of the two lateral extensions, the two lateral extensions including adjusting holes configured for adjusting the distance between the elbow cushions;
   a position hole located on a center of an upper surface of the position base; and
   an accessory handle having an end inserted into the position hole, the accessory handle extending away from the standpipe.

2. The accessory handle fixing base of claim 1, further comprising a position pipe mounted to the arc position sheet in a position underlying the accessory handle.

* * * * *